(12) United States Patent
Park et al.

(10) Patent No.: US 11,287,786 B2
(45) Date of Patent: Mar. 29, 2022

(54) STATISTICAL OVERPOWER PENALTY CALCULATION SYSTEM FOR GENERIC THERMAL MARGIN ANALYSIS MODEL

(71) Applicant: KEPCO NUCLEAR FUEL CO., LTD., Daejeon (KR)

(72) Inventors: Shane Park, Seoul (KR); Kanghoon Kim, Daejeon (KR); Hae Seuk Woo, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 0 days.

(21) Appl. No.: 17/089,281

(22) Filed: Nov. 4, 2020

(65) Prior Publication Data
US 2021/0141354 A1 May 13, 2021

(30) Foreign Application Priority Data
Nov. 13, 2019 (KR) .......................... 10-2019-0144909

(51) Int. Cl.
*G21C 17/06* (2006.01)
*G05B 19/042* (2006.01)
(Continued)

(52) U.S. Cl.
CPC ........... *G05B 19/042* (2013.01); *G06F 7/588* (2013.01); *G21C 17/06* (2013.01); *G21C 17/063* (2013.01);
(Continued)

(58) Field of Classification Search
CPC . G05B 19/042; G05B 2219/2639; G06F 7/58; G06F 7/588; G21C 17/06; G21C 17/063; G21D 3/001; G21D 3/04
See application file for complete search history.

(56) References Cited

U.S. PATENT DOCUMENTS

| | | | | |
|---|---|---|---|---|
| 4,080,251 A | * | 3/1978 | Musick | .................. G21D 3/001 376/217 |
| 4,330,367 A | * | 5/1982 | Musick | .................... G21D 3/04 376/245 |
| 2019/0139659 A1 | * | 5/2019 | Kim | ..................... G06K 9/6268 |

FOREIGN PATENT DOCUMENTS

KR 20040099884 A 12/2004

OTHER PUBLICATIONS

Jang, Byeong II, et al. "Assessment of the Best Estimate Thermal Design Method Using Thales Subchannel Code." (Year: 2015).*

(Continued)

*Primary Examiner* — Lily C Garner
(74) *Attorney, Agent, or Firm* — Levenfeld Pearlstein, LLC

(57) ABSTRACT

Provided is a statistical overpower penalty calculation system for a generic thermal margin analysis model, the system including: a random number generating unit generating a plurality of random numbers; an power distribution generating unit generating power information of an axial direction and a radial direction for a core burnup; an operating condition generating unit extracting an arbitrary value for a plurality of operating conditions from the random number generated above; a POL calculating unit calculating a POL of a reload core thermal margin analysis model and a POL of a generic thermal margin analysis model and calculating a plurality of the overpower penalties through the POLs; and a statistics processing unit calculating tolerance limit values according to the core burnup by statistically analyzing a distribution formed of the plurality of the overpower penalties and selecting a smallest tolerance limit value as a representative value of the overpower penalties.

3 Claims, 5 Drawing Sheets

(51) Int. Cl.
*G06F 7/58* (2006.01)
*G21D 3/00* (2006.01)
*G21D 3/04* (2006.01)

(52) U.S. Cl.
CPC ..... *G05B 2219/2639* (2013.01); *G21D 3/001* (2013.01); *G21D 3/04* (2013.01); *Y02E 30/30* (2013.01)

(56) References Cited

OTHER PUBLICATIONS

Nahm, Kee-Yil, et al. "Thermal margin model fortransition core of KSNP." Proceedings of the Korean Nuclear Society Conference. Korean Nuclear Society, 2004. (Year: 2004).*

* cited by examiner

FIG. 3

```
+------------------------------------------------------------+
.                                                            .
. See the file, Output/Summary/tmv_stat_result_lboc.out      .
.                                                            .
.                                                            .
.                  Summary of statistics                     .
.                  ---------------------                     .
.                                                            .
.         Number of data points  =         1172              .
.         Mean                   =       1.024828            .
.         Standard deviation     =       0.007021            .
.         D' statistic           =   11438.316120            .
.         D' 0.025               =   11246.800000            .
.         D' 0.975               =   11381.200000            .
.         Normality              =           FAIL            .
.                                                            .
.         Normal limit           =       1.012747            .
.         Nonparameteric limit   =       1.012507            .
.                                                            .
.         Minimum OP             =       1.007498            .
.                                                            .
.         Recommended OP         =       1.012507            .
.                                                            .
+------------------------------------------------------------+
```

FIG. 4

STATISTICAL OVERPOWER PENALTY CALCULATION SYSTEM FOR GENERIC THERMAL MARGIN ANALYSIS MODEL

CROSS REFERENCE TO RELATED APPLICATION

The present application claims priority to Korean Patent Application No. 10-2019-0144909, filed Nov. 13, 2019, the entire contents of which is incorporated herein for all purposes by this reference.

BACKGROUND OF THE INVENTION

Field of the Invention

The present invention relates to an overpower penalty calculation system for a generic thermal margin analysis model. More specifically, the present invention relates to a system calculating an overpower penalty for a thermal margin analysis model with a statistical method from a distribution formed of random numbers arbitrarily extracted within a range of each variable constituting the overpower penalty.

Description of the Related Art

When an initial core and a reload core of a Korean standard nuclear power plant are to be designed, three thermal margin analysis models, namely, reload core analysis model, generic analysis model, and on-line analysis model, are respectively used for evaluation of a thermal margin of a corresponding cycle's core. Among the three thermal margin analysis models, the generic thermal margin analysis model and the reload core thermal margin analysis model are compared with each other, whereby conservatism is verified. A conservatism comparison of the thermal margin analysis model is quantified in a form of an overpower penalty, and the overpower penalty is defined as a ratio of a power operating limit (POL) of the generic thermal margin analysis model and a POL of the reload core thermal margin analysis model, with respect to a same nucleate boiling ratio (DNBR) level.

$$\text{Overpower penalty} = \frac{POL \text{ of reload core thermal margin analysis model}}{POL \text{ of generic thermal margin analysis model}}$$

The overpower penalty is calculated by combining 4 types of axial power distributions with respect to COLSS Narrow 1~8 and CPC Narrow 1, 3, 5, and 7 operating conditions and is calculated for each of approximately 140 conditions by combining 10 types of axial power distributions with respect to nominal and CPC wide 1~8 operating conditions. Among the calculated overpower penalties, a minimum value is selected as a representative value of the overpower penalties of the generic thermal margin analysis model for a corresponding reload core.

However, as a limited number of operating conditions and axial power distributions are used, the overpower penalty of the generic thermal margin analysis model selected by this method is not able to reflect various combinations of operating conditions and axial power distributions. Therefore, the overpower penalties may be derived on the basis of limited information. In addition, since the minimum value among the overpower penalties of the limited range is selected as the representative value of the overpower penalty, the thermal margin may be excessively conservative.

The foregoing is intended merely to aid in the understanding of the background of the present invention and is not intended to mean that the present invention falls within the purview of the related art that is already known to those skilled in the art.

SUMMARY OF THE INVENTION

Accordingly, the present invention is an overpower penalty calculation system for a thermal margin analysis model and is intended to provide a reasonable and improved thermal margin by adjusting the thermal margin using an overpower penalty calculated by a statistical method.

In order to achieve the above objective, the present invention may be provided with a statistical overpower penalty calculation system for a generic thermal margin analysis model adjusting a thermal margin of a nuclear power plant using an overpower penalty calculated by a statistical method, the system including: a random number generating unit arbitrarily generating a plurality of random numbers; an power distribution generating unit generating axial and radial power information of a core; an operating condition generating unit extracting an arbitrary value for a plurality of operating conditions using the random numbers generated in the random number generating unit; a POL calculating unit calculating a POL of a reload core thermal margin analysis model and a POL of a generic thermal margin analysis model and calculating a plurality of the overpower penalties through the POL of the reload core thermal margin analysis model and the POL of the generic thermal margin analysis model; and a statistics processing unit calculating tolerance limit values according to the core burnup by statistically analyzing a distribution formed of the plurality of the overpower penalties and selecting a smallest tolerance limit value among the tolerance limit values as a representative value of the overpower penalty by comparing the tolerance limit values to each other, wherein the system may adjust the thermal margin of the nuclear power plant by reflecting the representative value in a calculation of the thermal margin.

The random number generating unit may generate a plurality of random numbers corresponding to a DNBR probability distribution, pressure, inlet temperature, and flow rate for each axial power distribution, and the operating condition generating unit may extract an arbitrary value according to the operating condition with the DNBR probability distribution, pressure, inlet temperature, and flow rate as the operating conditions.

The statistics processing unit may execute a normality test and perform a statistical analysis in which a parametric or nonparametric method is applied according to a result of the normality test.

As described above, according to the present invention, values corresponding to an operating condition range are arbitrarily extracted using a plurality of random numbers, and the tolerance limit values of the calculated overpower penalties are statistically analyzed and reflected in the thermal margin, so that a more rational and non-conservative thermal margin than the existing thermal margin can be calculated. In other words, by applying an optimized overpower penalty to a calculation of the uncertainty of DNBR, which is the main operating variable of a nuclear power plant, the thermal margin of the nuclear reactor is increased and the operational margin of the nuclear reactor is increased, whereby an economic effect may be obtained.

BRIEF DESCRIPTION OF THE DRAWINGS

The above and other objectives, features, and other advantages of the present invention will be more clearly understood from the following detailed description when taken in conjunction with the accompanying drawings, in which:

FIG. 3 shows a radial power distribution of a reload core according to the embodiment of the present invention;

FIG. 4 shows a result of statistical analysis of a distribution formed of a plurality of overpower penalties according to the embodiment of the present invention and shows an overpower penalty at a specific burnup according to the statistical analysis result.

DETAILED DESCRIPTION OF THE INVENTION

Figure 1:
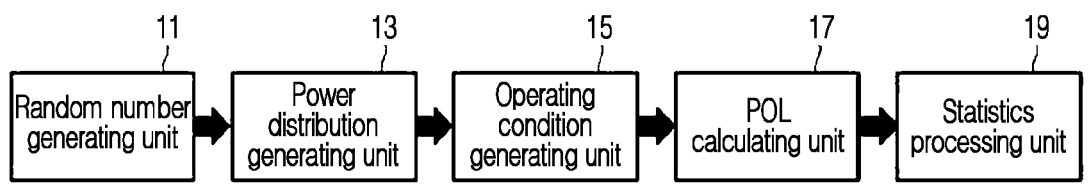
FIG. 1 shows a block diagram of a system calculating an overpower penalty for a thermal margin analysis model according to an embodiment of the present invention.

Herein below, the present invention will be described in detail with reference to the contents described in the accompanying drawings. However, the present invention is not limited or restricted by exemplary embodiments. The same reference numerals shown in each drawing indicate members that perform substantially the same function.

Objectives and effects of the present invention may be naturally understood or be made more obvious by the following description, and the objectives and effects of the present invention are not limited only by the following description. In addition, in describing the present invention, when it is determined that a detailed description of a known technology related to the present invention may unnecessarily obfuscate the subject matter of the present invention, a detailed description thereof will be omitted.

FIG. 1 shows a block diagram of a system 1 calculating an overpower penalty of a thermal margin analysis model according to an embodiment of the present invention.

The system 1 calculating the overpower penalty of the thermal margin analysis model may adjust a thermal margin of a nuclear power plant by using the overpower penalty calculated through a statistical method. As the overpower penalty is calculated by the statistical method, an improved thermal margin may be obtained.

With reference to FIG. 1, the system 1 calculating the overpower penalty of the thermal margin analysis model may include a random number generating unit 11, an power distribution generating unit 13, an operating condition generating unit 15, a power operating limit (POL) calculating unit 17, and a statistics processing unit 19.

The random number generating 11 may generate a plurality of arbitrary random numbers. In addition, the random number generating unit 11 may generate a plurality of random numbers corresponding to a DNBR probability distribution, pressure, inlet temperature, and flow rate for each axial power distribution. In addition, the random number generating unit 11 assumes the DNBR probability distribution as a normal distribution, and generates a normal random number through Box-Muller transformation using two random numbers. In addition, each of the pressure, inlet temperature, and flow rate is assumed as a uniform distribution and is required to have one random number, whereby three random numbers are required. Therefore, five random numbers may be generated for each one axial power distribution. Representative core burnups are SBOC, LBOC, LMOC, and LEOC, and 1,200 axial power distributions may be applied to each burnup. Therefore, the random number generating unit 11 may calculate a random number for each of 1,200 axial power distributions of each of the four burnups according to conditions of the DNBR probability distribution, pressure, inlet temperature, and flow rate, thereby generating a total of 24,000 (4×1,200×5) random numbers.

The power distribution generating unit 13 may generate power information of the axial direction and the radial direction of the core burnup. In addition, while the SBOC, LBOC, LMOC, and LEOC are the representative core burnups, the power distribution generating unit 13 may generate 1,200 axial power distributions at each burnup.

In addition, the power distribution generating unit 13 may generate whole power information by combining axial power information and radial power information. At this time, the power distribution generating unit 13 may use geometry information of the core analysis model of the radial output information as it is and combine a maximum value of a ¼ fuel assembly of a reload core limiting fuel assembly candidate model with the axial power information, thereby generating the whole power information.

The operating condition generating unit 15 may extract an arbitrary value for a plurality of operating conditions from the random number generated in the random number generator. In addition, the operating condition generating unit 15 may extract an arbitrary value in accordance with the operating condition with the DNBR probability distribution, pressure, inlet temperature, and flow rate as the operating condition. In addition, the operating condition generating unit 15 may assume the DNBR probability distribution as a normal distribution and calculate a value by applying two random numbers to the Box-Muller transformation. In addition, the operating condition generating unit 15 may assume the operating condition of each of the pressure, inlet temperature, and flow rate as a uniform distribution and apply one random number to a range for each condition, thereby calculating a value.

The POL calculating unit 17 may calculate a POL of the reload core thermal margin analysis model and a POL of the generic thermal margin analysis model and calculate a plurality of the overpower penalties through the POL of the reload core thermal margin analysis model and the POL of the generic thermal margin analysis model. The POL of the reload core thermal margin analysis model is expressed as $POL_{cycle}$, and the POL of the generic thermal margin analysis model may be expressed as $POL_{generic}$. An N-th overpower penalty calculated using $POL_{cycle}$ and $POL_{generic}$ is as shown in equation 1.

$$OP_N = \frac{POL_{cycle}}{POL_{generic}} \qquad \text{[Equation 1]}$$

The statistics processing unit 19 may form a plurality of distribution for each of the burnups with a plurality of overpower penalties calculated in the POL calculating unit 17 and calculate a tolerance limit value according to the burnup by statistically analyzing the distributions formed above. Statistical analysis executes a normality test, and when the distribution of the overpower penalties follows the normal distribution, a parametric method may be used, and when the distribution of overpower penalties does not follow a normal distribution, a nonparametric method may be used.

The statistics processing unit 19 may proceed statistical analysis with 95% confidence level for the distribution of overpower penalties and set the tolerance limit value calculated on the basis of 95% probability according to each burnup as the overpower penalty of the corresponding burnup. In addition, the statistics processing unit 19 may compare the plurality of the tolerance limit values according to each burnup and set the smallest tolerance limit value among the plurality of the tolerance limit values as a representative value of the overpower penalty of the corresponding core. The thermal margin of the corresponding core may be calculated by applying the representative value of the overpower penalties calculated statistically to the thermal margin analysis model.

Figure 2:
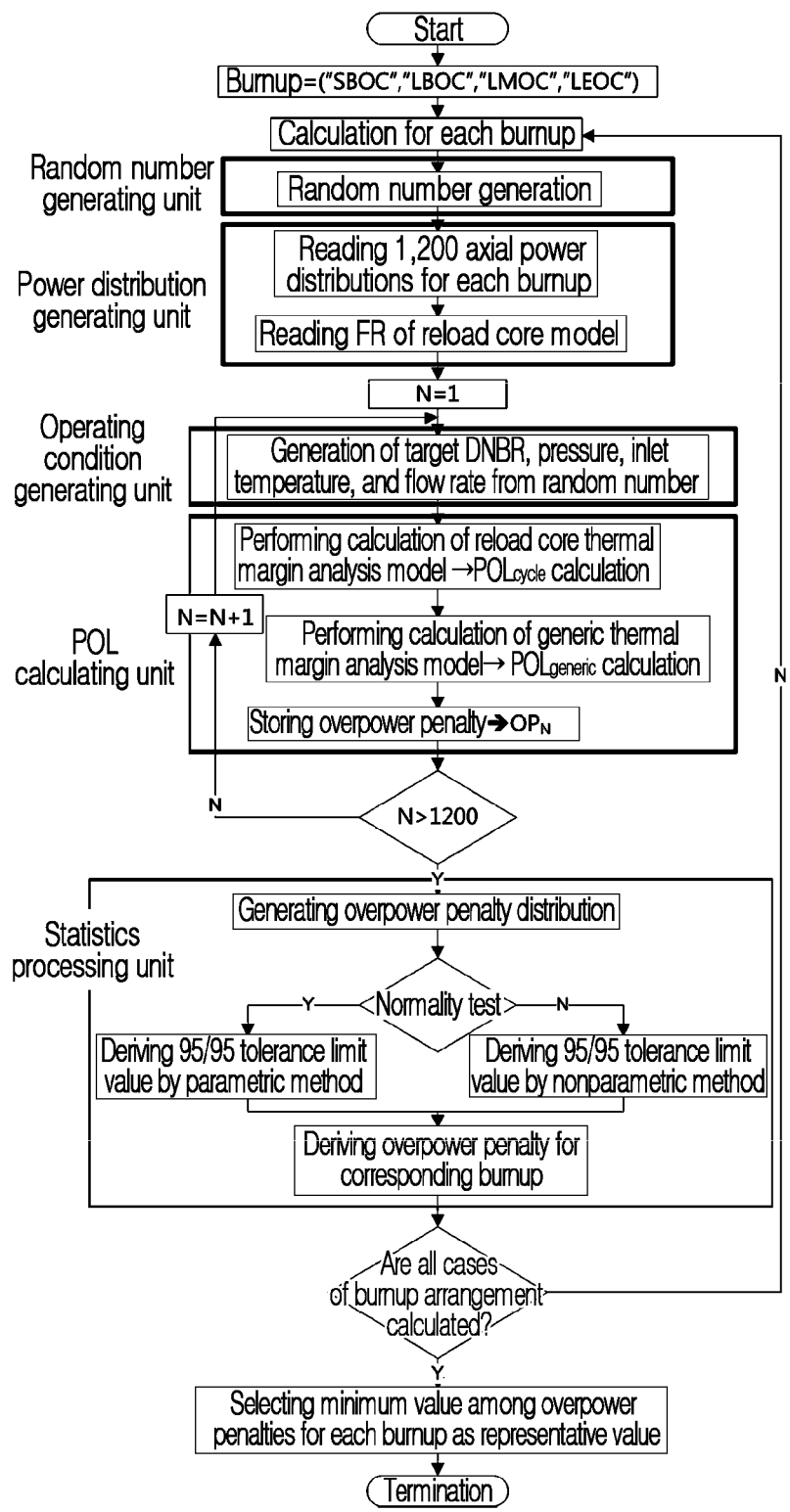
FIG. 2 shows a flowchart of calculating the overpower penalty by the system calculating the overpower penalty for the thermal margin analysis model according to the embodiment of the present invention.

FIG. 2 shows a flowchart of calculating the overpower penalty by the system calculating the overpower penalty for the thermal margin analysis model according to the embodiment of the present invention.

The overpower penalty calculation system 1 for the thermal margin analysis model generates five random numbers for each of 1,200 axial output distributions in the random number generating unit 11, and such a process is applied to each of a plurality of burnups. The power distribution generating unit 13 combines the axial power information and the radial power information to generate whole power information. The operating condition generating unit 15 calculates each condition value by applying random numbers to the Box-Muller transformation in the case of the DNBR probability distribution and by applying the random number to the range of the operating condition in the case of pressure, inlet temperature, and flow rate.

The POL calculating unit 17 calculates $POL_{cycle}$ by performing POL calculation of the reload core thermal margin analysis model, and calculates $POL_{generic}$ by performing POL calculation of the generic thermal margin analysis model. In addition, the POL calculating unit 17 calculates and stores the overpower penalty $OP_N$ through a ratio of the calculated $POL_{cycle}$ and $POL_{generic}$. The generation of the overpower penalties is performed 1,200 times as the same as the number of the axial power distributions, and 1,200 overpower penalties are generated and stored.

The statistics processing unit 19 proceeds statistical analysis by generating a distribution of the overpower penalties generated in the POL calculating unit 17. In addition, a normality test is executed on the distribution of overpower penalties, and a parametric or nonparametric method is applied according to a result of the normality test. At this time, an tolerance limit value is derived on the basis of 95 percent confidence level and a 95 percent probability. The derived tolerance limit value is set as an overpower penalty for a specific burnup. A plurality of overpower penalties calculated for each burnup is compared to each other, and a minimum value is set as the representative value of the overpower penalty. It is possible to calculate an optimized thermal margin by applying the representative value of the overpower penalties to DNBR uncertainty analysis.

Figure 3:
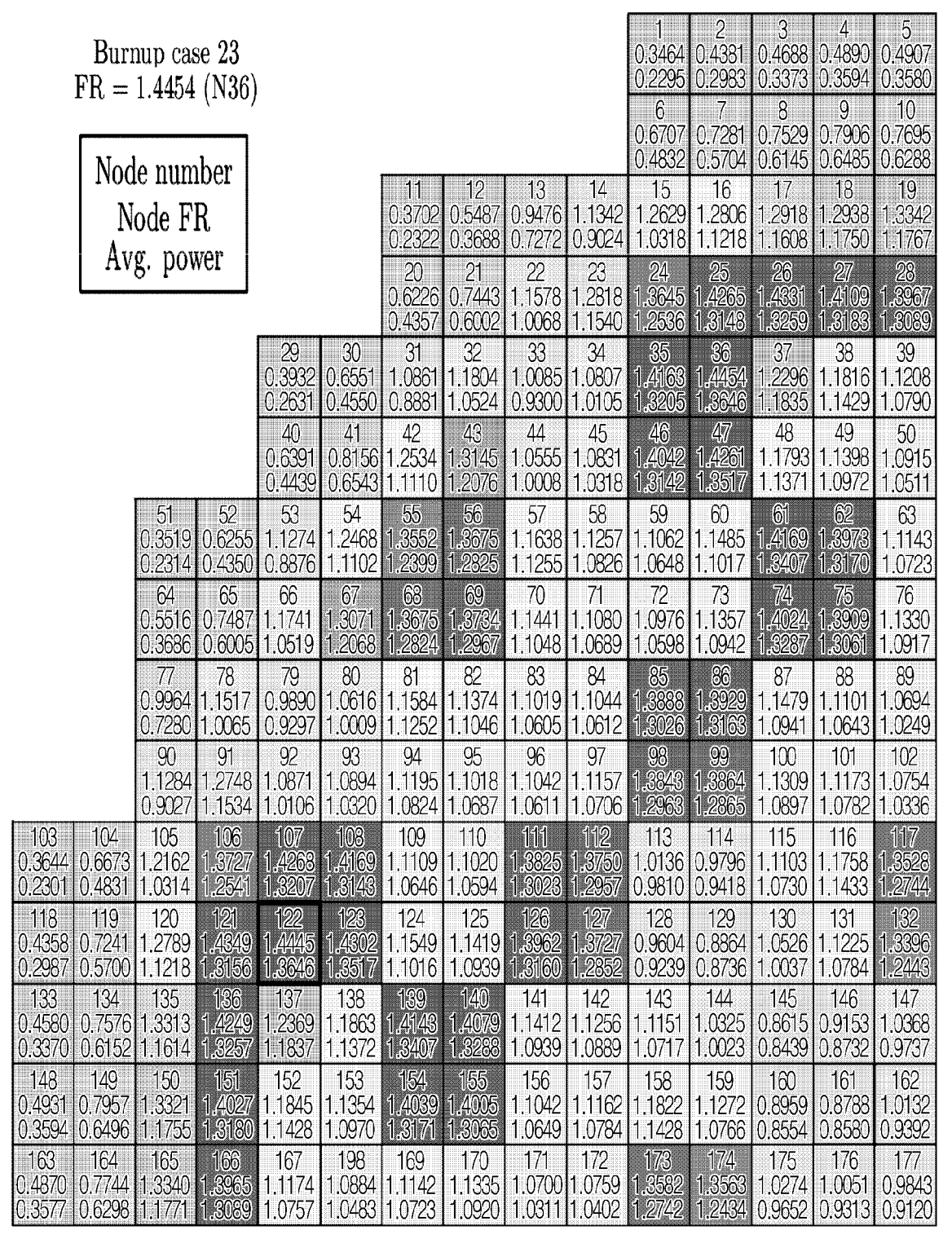

FIG. 3 shows a radial power distribution of a reload core according to the embodiment of the present invention, and the limiting fuel assembly candidate is indicated by a thick solid line.

FIG. 4 shows a result of statistical analysis of a distribution formed of a plurality of overpower penalties according to the embodiment of the present invention and shows an overpower penalty at a specific burnup according to the statistical analysis result. According to the exemplary embodiment of the present invention, FIG. 4 is a result in which a nonparametric method is applied after statistical analysis of the distribution of 1,172 overpower penalties has been performed showing the distribution of the overpower penalties not to follow the normality. At this time, the tolerance limit value calculated by applying the 95 percent confidence level and 95 percent probability is 1.012507, and this value is set as the overpower penalty of the corresponding burnup.

The statistics processing unit 19 proceeds statistical analysis by generating a distribution of the overpower penalties generated in the POL calculating unit 17. In addition, a normality test is executed on the distribution of the overpower penalties, and a parametric or nonparametric method is applied according to a result of the normality test. At this time, an tolerance limit value is derived on the basis of 95 percent confidence level and a 95 percent probability. The derived tolerance limit value is set as an overpower penalty for the specific burnup.

Figure 5:
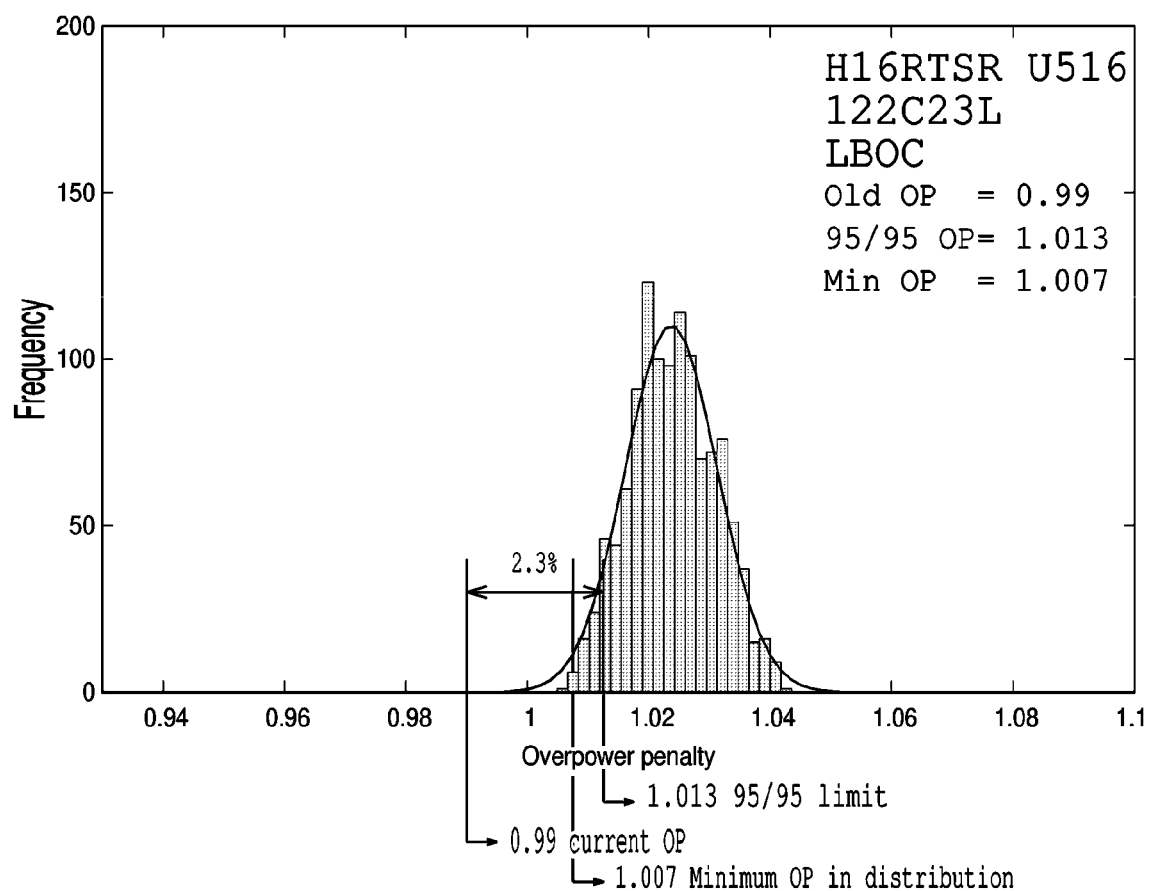
FIG. 5 shows an tolerance limit value calculated by a conventional overpower penalty calculation method and an tolerance limit value calculated by a statistical method in a distribution of overpower penalties formed of a plurality of overpower penalties according to the embodiment of the present invention.

FIG. 5 shows an tolerance limit value calculated by a conventional overpower penalty calculation method and an tolerance limit values calculated by a statistical method in a distribution of overpower penalties formed of a plurality of overpower penalties according to the embodiment of the present invention.

The conventional method was calculated in a conservative direction by selecting a minimum value among the overpower penalties calculated through the limited number of operating conditions and the axial power distributions when the overpower penalties of the generic thermal margin analysis model are calculated. According to FIG. 5, the overpower penalty calculated by the conventional method is 0.99. On the other hand, when the statistical method proposed according to the embodiment of the present invention is used, the calculated overpower penalty is 1.013. The method according to the embodiment of the present invention uses 1,200 axial power distributions of each core burnup and uses the statistical method using random numbers arbitrarily selected within a range of the operating conditions. As shown in FIG. 5, when the statistical method according to the embodiment of the present invention is used, the overpower penalty may be calculated in a direction in which the thermal margin is increased compared to the conventional method. It may be seen that the thermal margin increased by the statistical method according to the exemplary embodiment of the present invention is numerically increased by about 0.023 and proportionally by about 2.3 percent.

Although the present invention has been described in detail through the representative embodiment above, those of ordinary skill in the art to which the present invention pertains will understand that various modifications may be made to the above embodiment without departing from the scope of the present invention. Therefore, the scope of the present invention should not be determined by being limited to the described embodiment and should be determined by all changes or modified forms derived from the equivalent concept of claims as well as the claims to be described later.

What is claimed is:

1. A statistical overpower penalty calculation system for a generic thermal margin analysis model adjusting a thermal margin of a nuclear power plant using an overpower penalty calculated through a statistical method, the system comprising:
- a random number generating unit arbitrarily generating a plurality of random numbers;
- a power distribution generating unit generating power information of an axial direction and a radial direction for a core burnup;
- an operating condition generating unit extracting an arbitrary value for a plurality of operating conditions from the random numbers generated in the random number generating unit;
- a power operating limit (POL) calculating unit calculating a POL of a reload core thermal margin analysis model and a POL of a generic thermal margin analysis model and calculating a plurality of the overpower penalties through the POL of the reload core thermal margin analysis model and the POL of the generic thermal margin analysis model; and
- a statistics processing unit calculating tolerance limit values according to the core burnup by statistically analyzing a distribution formed of the plurality of the overpower penalties and selecting a smallest tolerance limit value among the tolerance limit values as a representative value of the overpower penalties by comparing the tolerance limit values to each other,
- wherein the system adjusts the thermal margin of the nuclear power plant by reflecting the representative value in a calculation of the thermal margin.

2. The system of claim 1, wherein the random number generating unit generates a plurality of random numbers corresponding to a departure from nucleate boiling ratio (DNBR) probability distribution, pressure, inlet temperature, and flow rate for each axial power distribution, and the operating condition generating unit extracts an arbitrary value according to the operating condition with the DNBR probability distribution, pressure, inlet temperature, and flow rate as the operating conditions.

3. The system of claim 1, wherein the statistics processing unit executes a normality test and performs a statistical analysis in which a parametric or nonparametric method is applied according to a result of the normality test.

* * * * *